May 24, 1938.    T. BARISH    2,118,027
SEAL FOR BEARING MECHANISMS
Filed May 1, 1935    2 Sheets-Sheet 1
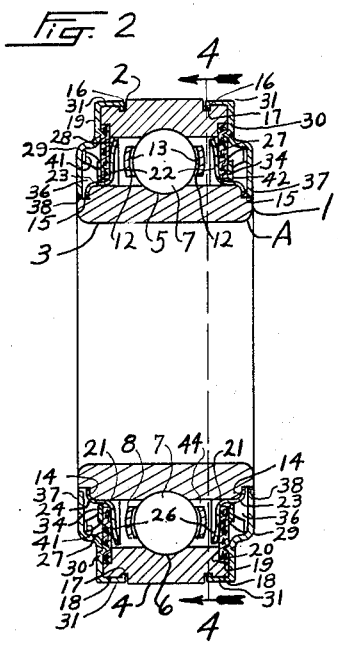
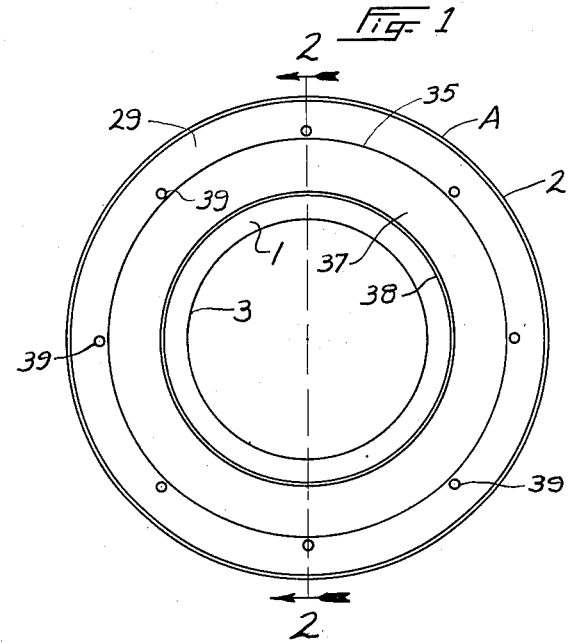
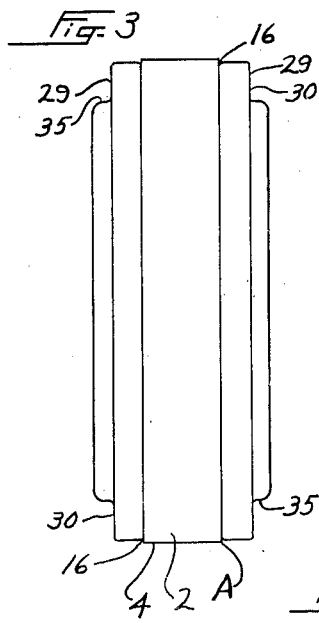
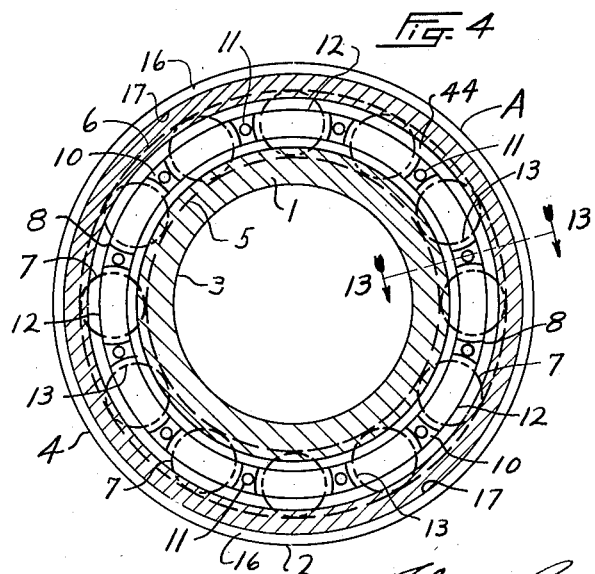
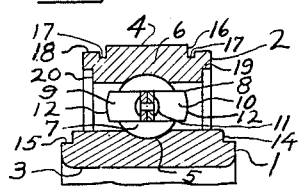
INVENTOR.
Thomas Barish
BY George B. Ingersoll
ATTORNEY.

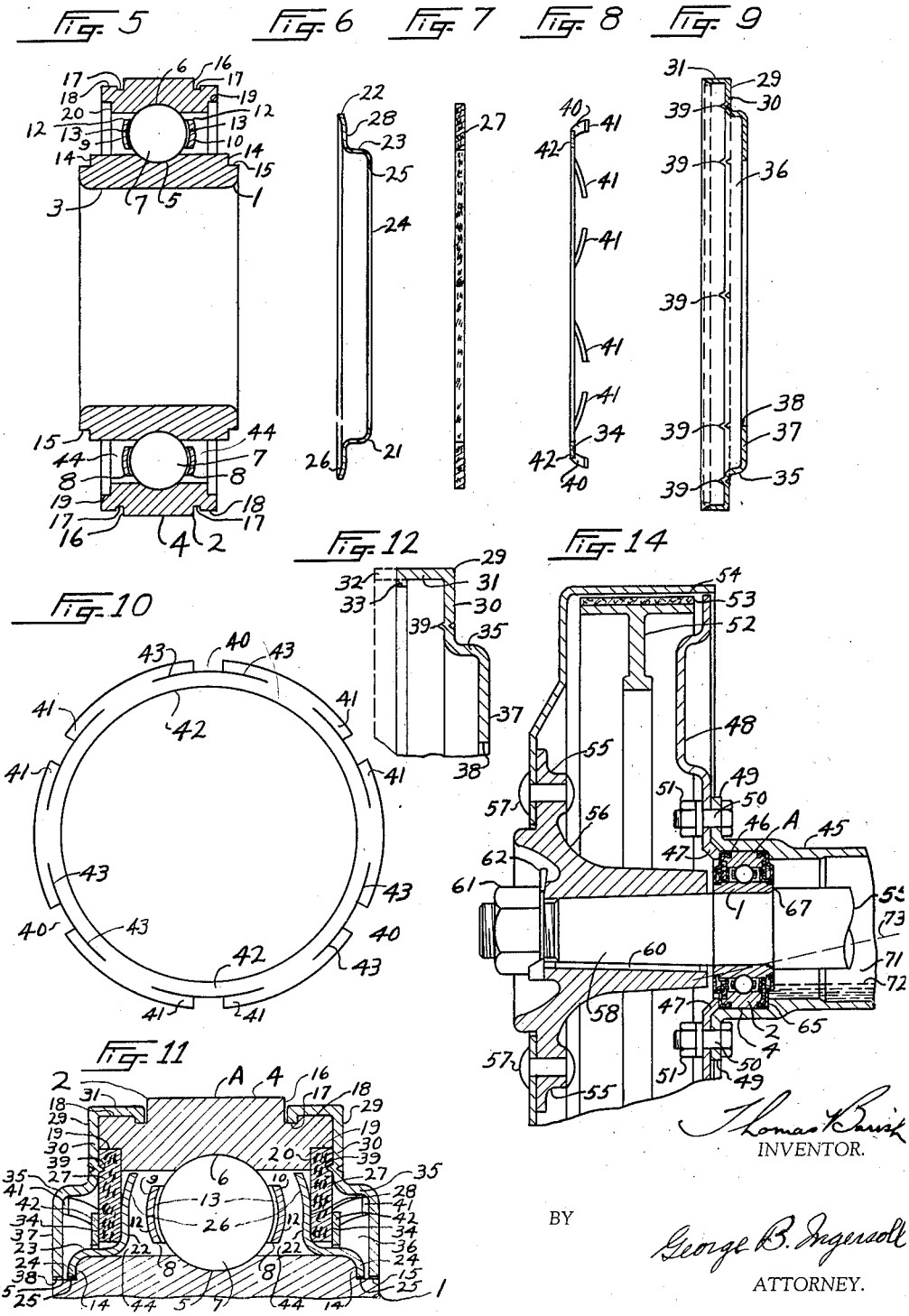

Patented May 24, 1938

2,118,027

UNITED STATES PATENT OFFICE 2,118,027

SEAL FOR BEARING MECHANISMS

Thomas Barish, Jamestown, N. Y., assignor to Marlin-Rockwell Corporation, Jamestown, N. Y., a corporation Application May 1, 1935, Serial No. 19,258

2 Claims. (Cl. 286—5)

My invention relates to improvements in bearing mechanisms provided with sealing means, and the objects of my improvements are, first, to provide a bearing mechanism with a sealing means that will prevent leakage of oil or lubricant into or out of the bearing mechanism; second, to provide a bearing mechanism with a sealing means adapted to prevent oil or lubricant from entering into and through the bearing mechanism even when the bearing mechanism is subjected to a positive hydraulic head and when the oil or lubricant is hot and thin; third, to provide a bearing mechanism with a plurality of shield or sealing means; fourth, to provide a bearing mechanism with a sealing means having its sealing contactual surfaces adapted for movement relative to another and maintained in positively closed contact, as regards the passage of oil or lubricant therebetween, by a resilient thrust load imposed thereon; fifth, to provide a bearing mechanism with a flexible gasket member anchored at its outer periphery and adapted to be flexed by constant resilient pressure applied transversely thereto to provide a positively closed engagement or contact between the flexible gasket member and a cooperating flinger member; sixth, to provide a bearing mechanism having rollably mounted members operating in a positively closed chamber; seventh, to provide a bearing mechanism having a pair of race members, one of the race members being provided with grooves for receiving the peripheral edges of cap members therein, the cap members further having annular edges located in close proximity to cylindrical surfaces on the other of the race members; eighth, to provide a bearing mechanism having a pair of race members together with a flinger member secured in close contact therewith and having a peripheral edge located in close proximity to an annular surface of the other race member; ninth, to provide a bearing mechanism with a flinger member having a radial section adjacent a gasket member engaging the flinger member; tenth, to provide a bearing mechanism having a cap or closure member secured thereto by spinning the peripheral edges of the cap or closure member into a groove of a race member of the bearing mechanism; eleventh, to provide a bearing mechanism having a gasket member together with a spring take up washer located in a chamber formed between a flinger member and a cap or closure member; twelfth, to provide a bearing mechanism having a cap or closure member having portions of itself displaced to form projecting portions for embedding into a gasket member to prevent relative movement between the gasket and cap or closure members; and thirteenth, to provide a take up washer with resilient feet or extension members formed by displacing the material of the take up washer, the displacement of the feet or extension portions providing a hub portion adapted for continuous and unobstructed engagement with a gasket member.

I attain these objects by mechanism illustrated in the accompanying drawings, in which—

Figure 1 is an end view of the bearing assembly; Fig. 2, a sectional view of the bearing assembly taken on the line 2—2, Fig. 1; Fig. 3, a side view of the bearing assembly; Fig. 4, a sectional view of the bearing assembly taken on the line 4—4, Fig. 1; Fig. 5, a sectional view of the bearing assembly without its sealing members, said sectional view being taken on the line 2—2, Fig. 1; Fig. 6, a sectional view of the flinger member taken on the line 2—2, Fig. 1; Fig. 7, a sectional view of the gasket or sealing member taken on the line 2—2, Fig. 1; Fig. 8, a sectional view of the spring take up washer taken on the line 2—2, Fig. 1; Fig. 9, a sectional view of the cap member taken on the line 2—2, Fig. 1; Fig. 10, a side view of the spring take up washer; Fig. 11, a partial sectional view of the bearing assembly taken on the line 2—2, Fig. 1, said partial sectional view being drawn to a larger scale than the assembly views of Figs. 2 and 5 to more clearly disclose the construction and operation of the sealing mechanism; Fig. 12, an enlarged partial sectional view of the cap member taken on the line 2—2, Fig. 1 and disclosing the shape of the section of the cap before and after assembly with the outer race member of the bearing assembly; Fig. 13, a partial section of the bearing assembly taken on the line 13—13, Fig. 4; and Fig. 14, a partial sectional view of a rear wheel and a rear axle of a vehicle disclosing a typical installation of my bearing mechanism.

The bearing assembly A is provided with the inner race member 1 and the outer race member 2, the inner race member 1 being provided with the bore 3 for providing a surface for mounting on shafts or similar parts of mechanisms in which the bearing assembly A is used, the outer race member 2 being provided with the outer cylindrical surface 4 for providing a surface for mounting in bores of hubs, housings and similar parts of mechanisms in which the bearing assembly A is used.

The inner race member 1 is provided with the outer raceway or surface 5 and the outer race member 2 is provided with the annular raceway or surface 6, the balls 7 being rollably mounted between the inner and outer race members 1 and 2 and rollably engaging the raceways 5 and 6, the balls 7 thus being adapted to absorb loads imposed radially on the bearing assembly A and also, to a lesser extent, to absorb thrust loads imposed from either direction along the axis of or longitudinally of the bearing assembly A.

The balls 7 are maintained in a spaced relationship one to another around the bearing assembly A by the cage mechanism 8 comprising the bars or members 9 and 10 which have adjacent portions contacting one another substantially in a plane extending through the axes of the balls 7 and at the longitudinal central portion of the bearing assembly A, said adjacent portions of the bars 9 and 10 being secured together by the rivets 11, the bars 9 and 10 each being further provided with the flange portions 12 for partially enclosing the balls 7 to retain them in the cage mechanism 8, the flange portions being provided with the spherical surfaces 13 which loosely fit around the balls 7. The inner race member 1 is provided, at each of its ends, with the shoulder or shouldered portion 14 adjacent the cylindrical or undercut surface 15. The outer race member 2 is provided, at each of its ends, with the shoulder or shouldered portion 16 forming a wall surface of the groove or undercut portion 17, the groove 17 being located at the inner end of the cylindrical or undercut surface 18.

The outer race member 2 is further provided, at each of its ends, with the annular recess or counterbore 19 having the shoulder or shouldered portion 20 at its inner end.

The flinger or member 21 is provided with the flinger or flange portion 22 together with the hub or cylindrical portion 23 having the annular flange 24 extending inwardly therefrom, the annular flange 24 being provided with the hole or bore 25. The flinger or flange portion 22 is provided with the curved or radial portion 26 having its concave surface located at its inner side relative to the balls 7 and the cage mechanism 8, the radial portion 26 further having its concave surface located at its outer side and adjacent the inside surface of the gasket member 27, the flinger or flange portion 22 being provided with the surface 28 which extends substantially at right angles to the axis of the bearing assembly A and provides an abutment or contactual surface for engaging the gasket member 27. The flinger member 21 is preferably constructed of sheet material of sufficient thickness to render it relatively rigid to withstand the pressure or thrust load of the gasket member 27 as it is maintained in positively closed contact therewith as hereinafter disclosed. The inside or annular surface of the cylindrical portion 23 of the flinger member 21 is snugly fitted, as by a press fit, to the outside cylindrical surface of the inner race member 1, the inside surface of the annular flange 24 being maintained in close abutting contact with the surface of the shoulder 14 of the inner race member 1 by the above mentioned press fit of the cylindrical portion 23 on the inner race member 1 and further by the pressure with which the gasket member 27 is maintained in contactual engagement with the surface 28 of the flinger member 21 as hereinafter disclosed, the flinger member 21 and the inner race member 1 thus being assembled in a manner to provide a seal to prevent the leakage of any oil or lubricant therebetween.

Also the radial portion 26 of the flinger member 1 will perform a flinger operation by tending to throw the oil or lubricant, which is to be retained within the bearing mechanism and which is packed or placed around the balls 7 for lubricant purposes, away from the gasket member 27 and preventing said lubricant within the bearing mechanism A from escaping therefrom between the surface 28 of the flinger member 21 and the gasket member 27. Also the radial portion 26 will protect the gasket member 27 from injury as by being gouged or cut by the sharp peripheral edge of the radial portion 26 when there is relative movement between the flinger member 21 and the gasket member 27 as occasioned by the revolving operation of the race members of the bearing mechanism A.

It is also to be noted that the peripheral edge of the radial portion 26 of the flinger member 21 will be located adjacent the inside or annular surface of the outer race member 2 with substantially an operating clearance space only therebetween to further assist in preventing the lubricant within and around the balls 7 from being churned and thrown into contact with the gasket member 27 and thus further preventing said lubricant from passing outwardly between the flinger member 21 and the gasket member 27.

The gasket member 27 is retained in the annular recess or counterbore 19 of the outer race member 2 and in abutment or contact with the shoulder 20 by the cap, cover, closure, end or retainer member 29, the thickness of the gasket member 27 being sufficient to cause it to be compressed or squeezed into the annular recess or counterbore 19 to prevent relative movement between the gasket member 27 and the outer race member 2 and to insure the gasket member 27 revolving or remaining stationary with the outer race member 2 in accordance with the operation of the bearing assembly A as assembled in a mechanism.

The cap member 29 is provided with the flange or web portion 30 for contacting and abutting the gasket member 27, the flange portion 30 being extended to form the cylindrical or hub portion 31 having its annular or inside surface snugly contacting, as by a press fit, the cylindrical surface 18 of the outer race member 2 while the flange portion 30 abuts and contacts the end surface of the outer race member 2. The cylindrical portion 31 is constructed with sufficient length, as indicated by the dotted lines 32, Fig. 12, to permit its peripheral edge portion to be spun and formed to the annular flange 33 which fits and extends within the grooves 17 of the outer race member 2, the annular flange 33 thus being made to snugly engage the groove 17 to rigidly secure the cap member 29 and the gasket member 27 to the outer race member 2 and to maintain the gasket member 27 in contactual engagement with the flinger member 21, the spinning operation to form the cylindrical portion 31 to the annular flange 33 in the groove 17 being performed after the flinger member 21, the gasket member 27 and the spring take up washer 34 have been assembled relative to the inner and outer race members 1 and 2.

The cap member 29 is formed of material having flexible characteristics which permit the gasket member 27 to be secured at its outer peripheral edge portion in an anchored position between the outer race member 2 and the cap member 29 and at the same time allows the inner annular portion of the gasket member to be sufficiently flexed to maintain it in contact with the surface 28 of the flinger member 21.

The cap member 29 is further provided with the cylindrical portion 35 which further provides the chamber 36 for containing the spring take up washer 34, the cylindrical portion 35 being extended to form the annular flange 37 having the bore or opening 38 therein, the inner peripheral edges of the annular flange 37 being located adjacent the cylindrical surface 15 of the inner race member 1 to provide substantially a working or operative clearance only to permit a minimum space or aperture between the bore or opening 38 of the annular flange 37 and the cylindrical surface 15 of the inner race member 1 for the entrance of oil or lubricant which may surround or submerge the bearing mechanism A. The flange portion 30 of the cap member 29 is displaced at spaced intervals to form the conical shaped projections 39 which engage and are imbedded into the gasket member 27 and provide further means for securing and anchoring the gasket member 27 in a fixed position relative to the cap member 29 and the outer race member 2. The spring take up washer 34 is constructed of resilient material such as spring steel and is provided with a plurality of notches 40 which permit the finger portions 41 to be severed from the hub portion 42 along the lines 43, the finger portions 41 being formed or offset so their free ends will bear on and contact with the inside surface of the annular flange 37 while the hub portion 42 will present a smooth, unobstructed and continuous surface for contacting and engaging the gasket member 27, the height or overall width of the spring take up washer 34 being greater than the width of the recess 36 so that the height or overall width of the take up washer 34 will be compressed in its assembly in the recess 36 to result in a resilient load or pressure being exerted against the gasket member 27 to provide a positively closed and spring loaded contact or engagement between the surface 28 of the flinger member 21 and the gasket member 27 so that under no circumstances can oil or lubricant pass from the outside to the chamber 44 in which the balls 7 are operatively mounted nor can any oil or lubricant pass from the chamber 44 to the outside of the bearing mechanism even though the oil or lubricant is hot and thin or even when a positive hydraulic head is built up around the bearing mechanism, as for instance when my bearing mechanism is installed in the hub of a rear wheel of an automotive vehicle and the oil or lubricant in the rear axle of the vehicle, due to the inclination or tilt of the rear axle and the vehicle, tends to flow from the rear axle to a position adjacent and where it submerges or partially submerges the bearing mechanism and which in a conventional bearing mechanism or in a bearing mechanism provided with inefficient shield or sealing means would result in the leakage of oil from the rear axle and through bearing mechanisms and to the brake mechanisms of the vehicle, said brake mechanisms being located adjacent the rear wheel and hub bearing mechanisms and in which my bearing mechanism is especially adapted for installation.

It is to be understood that my bearing mechanism thus discloses a double shielded bearing mechanism and the double shield or sealing mechanism of my invention is readily adaptable for installation in bearing mechanisms employing ball or roller members in either single or double rows without departure from the scope and spirit of my invention.

Fig. 14 discloses a typical installation of my bearing mechanism in a partially disclosed rear wheel and rear axle mechanism of a vehicle in which the housing 45 of the rear axle assembly of the vehicle is provided with the bore 46 in which the bearing mechanism A is inserted and secured by the extension portion 47 of the flange or backing plate 48 which is secured to the flange 49 of the housing 45 by the bolts 50 and nuts 51, the backing plate 48 suitably providing support and anchorage means for the brake shoe 52 provided with the brake lining 53 for engaging the brake drum 54 which is secured to the flange 55 of the hub 56 by the rivets 57, the hub 56 being secured on the tapered end 58 of the axle or drive shaft 59 by the key 60, the nut 61 and the lock washer 62.

It is to be noted that the cylindrical surface 4 of the outer race member 2 will engage and be supported by the annular surface of the bore 46 and the flange portions 30 of the cap member 29, at each end of the bearing mechanism A, will be engaged respectively by the shoulder or shouldered portion 65 of the housing 45 and the extension portion 47 of the flange or backing plate 48.

Also the inner race member 1 will be mounted on the cylindrical portion 66 of the axle shaft 59, one end of the inner race member 1 abutting the shoulder or shouldered portion 67 of the axle shaft 59.

The housing 45 is provided with the chamber 71 which contains the oil or lubricant in the rear axle, the normal height of the oil or lubricant being indicated by the line 72. When the rear axle together with the housing 45 and its operatively supported and connected parts are tilted at an angle, the oil or lubricant can easily arise to a possible height, shown by the line 73 and drawn at an angle to indicate the tilt of the rear axle of the vehicle, and thus form a positive hydraulic head, and when the oil or lubricant is hot and thin, it will build up a positive hydraulic head adjacent the bearing assembly A and when conventional bearing mechanisms are used, the oil or lubricant seeps or leaks through said conventional bearing mechanisms and on to the brake lining 53 of the brake shoe 52 and the inside surface of the brake drum 54 with the result that the brake mechanism grabs and locks and operates inefficiently. However, when my double shielded bearing mechanism A is installed in the rear axle of a vehicle, as typically disclosed in Fig. 14, the positive hydraulic head of the oil or lubricant is unable to force the oil or lubricant through the bearing mechanism A as this is prevented even when the oil or lubricant is hot and thin and under a positive hydraulic head by the positively closed and spring loaded contact or engagement of the gasket member 27 with the surface 28 of the flinger member 21 in my invention and this is so even with the flinger member 21 rotatably engaging the gasket member 27.

In operation, the bearing mechanism A is secured in a supporting housing by suitably clamping the outer race member 2 together with its cap members 29 and gasket members 27 against longitudinal and rotative movement relative to the supporting housing while the inner race member 1 is supported on a shaft member extending through and engaging the bore of the inner race member.

The gasket member 27 is maintained in a positively closed and engaged position relative to the surface 28 of the flinger member 21 by the resilient thrust of the spring actuated take up washer 34 pressing against the gasket member 27, thus positively preventing any oil or lubricant placed within the chamber 48, for the purpose of lubricating the balls 7 and the raceways 5 and 6, from seeping or leaking out of the bearing assembly A and at the same time positively preventing any oil or lubricant adjacent the outside of the bearing mechanism A from seeping or leaking into the bearing mechanism A even though said oil or lubricant is under a positive hydraulic head and also when said oil or lubricant is hot and thin.

I claim:

1. In a sealing mechanism for a pair of concentric members spaced by bearing members to permit relative rotation, the inner concentric member being provided with a shouldered surface at its outer end, the outer concentric member having a shorter length than the inner concentric member together with a shouldered recess at its end, the combination of a flinger member having a hub portion mounted on said inner concentric member together with an annular flange engaging said shouldered surface of said inner concentric member, said flinger member having its flinger portion curved toward said bearing members, a flexible gasket mounted in said shouldered recess of said outer concentric member and engaging said flinger portion, a cap member mounted on said outer concentric member and provided with a flange portion engaging an end surface of said outer concentric member together with said flexible gasket, said cap member having portions of itself displaced to engage and anchor said flexible gasket, said cap member being further provided with an annular flange portion extending substantially flush with the end surface of and surrounding said shouldered surface at the outer end of said inner concentric member, and a take up washer interposed between said flexible gasket and said annular flange portion of said cap member, said take up washer being provided with a hub portion engaging said flexible gasket together with resilient finger portions displaced from said hub portion and engaging said annular flange portion of said cap member.

2. In a sealing mechanism for a pair of concentric members spaced by bearing members to permit relative rotation, the outer concentric member having a counterbore in its end portion, the combination of a flinger member mounted on the inner concentric member and forming an end wall portion of a lubricant chamber between said concentric members and around said bearing members, a cap member mounted on the outer concentric member and tightly enclosing its end portion, said cap member being provided with an annular flange surrounding an end portion of the inner concentric member to form a second chamber adjacent said end wall portion formed by said flinger member, a gasket member mounted between said outer concentric member and said cap member in said counterbore and extending within said second chamber and engaging said flinger member to prevent lubricant from entering said second chamber, said gasket member being clamped in said counterbore by said cap member, and resilient means mounted in said second chamber between said annular flange of said cap member and said gasket member for exerting pressure on said gasket member to cause said gasket member to more effectively engage said flinger member and seal said second chamber against the entry of lubricant from said first mentioned chamber.

THOMAS BARISH.